US008702326B2

(12) United States Patent
Faulkner et al.

(10) Patent No.: US 8,702,326 B2
(45) Date of Patent: Apr. 22, 2014

(54) SPLICE PROTECTOR FOR FIBER OPTIC RIBBONS

(75) Inventors: Michael T. Faulkner, Granite Falls, NC (US); Lars K. Nielsen, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 142 days.

(21) Appl. No.: 13/491,086

(22) Filed: Jun. 7, 2012

(65) Prior Publication Data
US 2013/0251317 A1    Sep. 26, 2013

Related U.S. Application Data

(60) Provisional application No. 61/614,839, filed on Mar. 23, 2012.

(51) Int. Cl.
*G02B 6/255* (2006.01)

(52) U.S. Cl.
CPC .............. *G02B 6/2557* (2013.01); *G02B 6/255* (2013.01); *G02B 6/2553* (2013.01); *G02B 6/2556* (2013.01); *G02B 6/2558* (2013.01)
USPC ................... 385/99; 385/95; 385/96; 385/97; 385/98

(58) Field of Classification Search
CPC .... G02B 6/255; G02B 6/2553; G02B 6/2556; G02B 6/2557; G02B 6/2558
USPC ......................................... 385/96, 97, 98, 99
See application file for complete search history.

(56) References Cited

U.S. PATENT DOCUMENTS

| 4,475,935 | A | | 10/1984 | Tanaka et al. ................... 65/3.41 |
| 4,784,458 | A | | 11/1988 | Horowitz et al. ........... 350/96.21 |
| 5,157,751 | A | | 10/1992 | Maas et al. ....................... 385/99 |
| 5,257,337 | A | * | 10/1993 | Grigsby et al. .................. 385/99 |
| 5,731,051 | A | | 3/1998 | Fahey et al. .................. 428/34.9 |
| 6,265,476 | B1 | | 7/2001 | Krongauz et al. ............. 524/262 |

(Continued)

FOREIGN PATENT DOCUMENTS

| DE | 4343944 A1 | 6/1995 | .............. G02B 6/44 |
| GB | 2324622 | 10/1998 | ............. G02B 6/255 |

OTHER PUBLICATIONS

Patent Cooperation Treaty International Search Report, Application No. PCT/US2013/033477, Jun. 19, 2013, 3 pages.

*Primary Examiner* — Ryan Lepisto
(74) *Attorney, Agent, or Firm* — Russell Scott Magaziner

(57) ABSTRACT

A fiber optic assembly includes first and second fiber optic ribbons and a splice protector. Each of the first and second fiber optic ribbons includes a plurality of optical fibers coupled in a substantially flat arrangement, where the optical fibers are aligned side-by-side with one another. The optical fibers of the first ribbon are fusion spliced with the optical fibers of the second ribbon such that the spliced ribbons at the splice have a common lengthwise axis, widthwise axis orthogonal to the lengthwise axis, and thickness axis orthogonal to the lengthwise and widthwise axes. The splice protector supports the optical fibers of the first and second fiber optic ribbons that are spliced to one another at the splice. The splice protector includes an ultra-violet light (UV-) curable adhesive that provides a flexible support for the splice, and is at least half as flexible when cured over the splice as the first and second ribbons in bending about the widthwise axis.

18 Claims, 4 Drawing Sheets

(56) References Cited

U.S. PATENT DOCUMENTS

| | | | |
|---|---|---|---|
| 7,251,411 B1 | 7/2007 | Lu et al. | 385/147 |
| 7,289,714 B1 | 10/2007 | Wells | 385/135 |
| 7,349,605 B2 | 3/2008 | Noonan et al. | 385/100 |
| 7,424,189 B2 | 9/2008 | Lu et al. | 385/100 |
| 7,454,106 B2 | 11/2008 | Cobb, III et al. | 385/100 |
| 7,480,436 B2 | 1/2009 | Wells et al. | 385/134 |
| 7,489,843 B2 | 2/2009 | Carlson et al. | 385/100 |
| 7,556,441 B2 * | 7/2009 | Furuyama | 385/95 |
| 7,840,109 B2 | 11/2010 | Lu et al. | 385/114 |
| 7,941,021 B2 | 5/2011 | Cody et al. | 385/100 |
| 8,333,519 B2 | 12/2012 | Marcouiller et al. | 385/95 |
| 2002/0000192 A1 | 1/2002 | Kojima et al. | 118/620 |
| 2010/0247044 A1 | 9/2010 | Noddings et al. | 385/99 |
| 2012/0134629 A1 | 5/2012 | Lu et al. | 385/77 |

* cited by examiner

SPLICE PROTECTOR FOR FIBER OPTIC RIBBONS

RELATED APPLICATION

This application claims the benefit of priority under 35 U.S.C. §119 of U.S. Provisional Application Ser. No. 61/614,839 filed on Mar. 23, 2012, the content of which is relied upon and incorporated herein by reference in its entirety.

BACKGROUND

Aspects of the present disclosure relate generally to splice protectors for multi-fiber splicing such as splicing of fiber optic ribbons, where the splice protector surrounds and supports the splice to provide structural reinforcement to the area of the splice.

Splice protectors may be bulky and rigid, interfering with the ability to wind a spliced fiber optic ribbon on a reel or spool, or the ability to place the spliced ribbon in a narrow cavity, such as the cavity of a furcation tube or fiber optic distribution cable. A need exists for a splice protector that may be applied to a splice of spliced fiber optic ribbons in a time- and space-efficient manner, while allowing the spliced ribbons at the splice to actively flex and bend, as may facilitate placement of the spliced ribbons in an actively handled fiber optic assembly.

SUMMARY

One embodiment relates to a fiber optic assembly, which includes first and second fiber optic ribbons and a splice protector. Each of the first and second fiber optic ribbons includes a plurality of optical fibers coupled in a substantially flat arrangement, where the optical fibers are aligned side-by-side with one another. The optical fibers of the first ribbon are fusion spliced with the optical fibers of the second ribbon such that the spliced ribbons at the splice have a common lengthwise axis, widthwise axis orthogonal to the lengthwise axis, and thickness axis orthogonal to the lengthwise and widthwise axes. The splice protector supports the optical fibers of the first and second fiber optic ribbons that are spliced to one another at the splice. The splice protector includes an ultra-violet light (UV-) curable adhesive that provides a flexible support for the splice, and is at least half as flexible when cured over the splice as the first and second ribbons in bending about the widthwise axis.

Another embodiment relates to a fiber optic assembly, which includes first and second fiber optic ribbons and a splice protector. The first and second fiber optic ribbons each include a plurality of optical fibers coupled in a substantially flat arrangement where the optical fibers are aligned side-by-side with one another. The optical fibers of the first ribbon are fusion spliced with the optical fibers of the second ribbon such that the spliced ribbons at the splice have a common lengthwise axis, widthwise axis orthogonal to the lengthwise axis, and thickness axis orthogonal to the lengthwise and widthwise axes. The splice protector supports the optical fibers of the first and second fiber optic ribbons that are spliced to one another at the splice, and includes a UV-curable adhesive facilitating a controlled profile for the splice protector. The UV-curable adhesive has a low-profile, having a thickness in the thickness axis that is less than 1 mm thicker than either the first or second fiber optic ribbons in the thickness axis. Also, the UV-curable adhesive has a narrow-profile, having a width in the width axis that is less that 1 mm wider than either the first or second fiber optic ribbons in the width axis.

Yet another embodiment relates to a method of manufacturing a fiber optic assembly. The method includes a step of splicing first and second fiber optic ribbons, each including a plurality of optical fibers coupled in a substantially flat arrangement where the optical fibers are aligned side-by-side with one another. The splicing includes fusion splicing optical fibers of the first ribbon with the optical fibers of the second ribbon such that the spliced ribbons at the splice have a common lengthwise axis, widthwise axis orthogonal to the lengthwise axis, and thickness axis orthogonal to the lengthwise and widthwise axes. The method further includes another step of coupling a substrate with the first and second fiber optic ribbons, where the substrate is translucent and able to communicate ultra-violet light. Another step of the method includes applying a liquid, UV-curable adhesive around the splice and supported by the substrate. Yet another step of the method includes directing ultra-violet light through the substrate and at the UV-curable adhesive to cure the UV-curable adhesive, encapsulating the splice and forming a splice protector.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present invention is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figure 1:
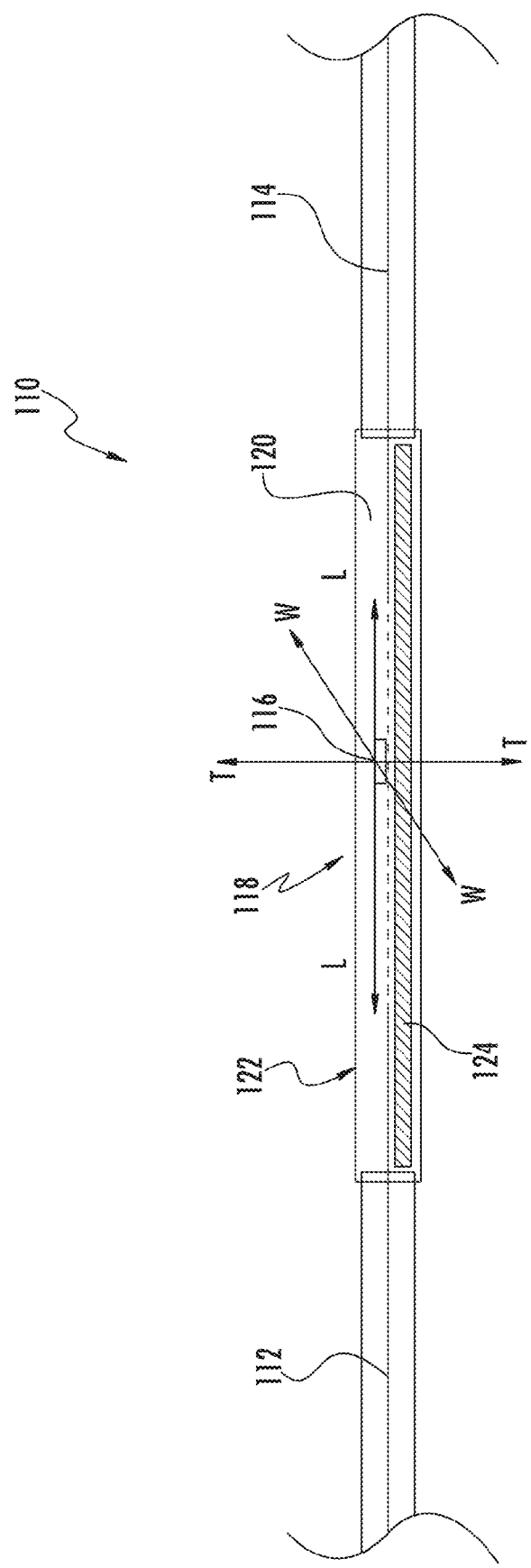
FIG. 1 is a schematic view of a splice protector according to an exemplary embodiment.
Figure 2:
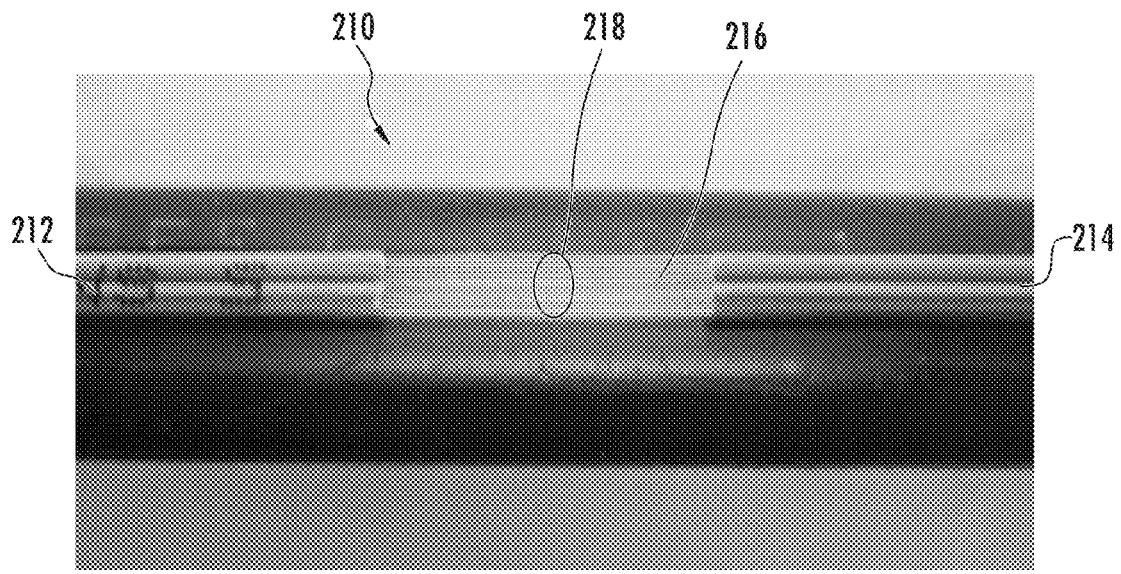
FIG. 2 is a digital image of a splice between two fiber optic ribbons.

Referring to FIG. 1, a fiber optic 110 assembly includes first and second fiber optic ribbons 112, 114 (side view), each including a plurality of optical fibers (see, e.g., fibers 216 as shown in FIG. 2), such as at least 2, at least 6, or at least 12 optical fibers. According to an exemplary embodiment, the optical fibers of the ribbons 112, 114 are coupled to the other optical fibers of the respective ribbons 112, 114 in a substantially flat arrangement (e.g., planar) where the optical fibers are aligned side-by-side with one another to form the ribbons 112, 114.

According to an exemplary embodiment, the optical fibers of the first ribbon 112 are fusion spliced with the optical fibers of the second ribbon 114 such that the spliced ribbons 112, 114 at the splice 116 have a common lengthwise axis L, widthwise axis W orthogonal to the lengthwise axis L, and thickness axis T orthogonal to the lengthwise and widthwise axes, L, W. A splice protector 118 supports the optical fibers of the first and second fiber optic ribbons 112, 114 that are spliced to one another at the splice 116. According to an exemplary embodiment, the splice protector 116 includes an ultra-violet light (UV-) curable adhesive 120 that provides a flexible support for the splice 116. The UV-curable adhesive 120 encapsulates the spliced optical fibers of the first and second ribbons 112, 114 and also provides tensile strength to the splice 116.

In some embodiments, the splice protector 118 is at least half as flexible as either of the first and second ribbons 112, 114 in bending about the widthwise axis W (e.g., at least 60%, at least 75%), where flexibility or stiffness corresponds to the stiffness coefficient (i.e., force applied over resulting displacement) of the respective element. For example, flexibility may be observed with the moment required to bend the splice protector 118 about the widthwise axis W and an equal length of one of the ribbons 112, 114 in a cantilever arrangement by a vertical deflection of the free end that is ten percent of the length. In some such embodiments, the splice protector 116 is at least as flexible as the first and second ribbons 112, 114 in bending about the widthwise axis W.

Flexibility allows the splice protector 118 and splice 116 to bend and move with the spliced ribbons 112, 114 around curved surfaces, such as a spool or reel for a corresponding fiber optic cable or assembly that includes the spliced ribbons 112, 114. Without sufficient flexibility, the splice protector 118 may pin or otherwise load the optical fibers of the ribbons 112, 114, particularly at the lengthwise ends of the spice protector 118, possibly leading to attenuation and/or damaging the optical fibers. Accordingly, sufficient flexibility of the splice protector 118 may reduce stress concentrations, facilitating improved performance of the optical fibers of the splice 116.

Various types of commercially-available UV-curable adhesives are contemplated for use with splice protectors, some of which have undergone testing by the Applicants. Examples of UV-curable adhesives for the splice protector 118 include commercially-available UV-curable adhesives manufactured by PENN COLOR and commercially-available UV-curable adhesives manufactured by LOCTITE. More specifically, the PENN COLOR UV-curable adhesives contemplated for use with splice protectors include material numbers are 706, RP54, 518, and RS81 and the LOCTITE UV-curable adhesives contemplated for use with splice protectors include LOCTITE® 3974™ LIGHT CURE and LOCTITE® 3106™ LIGHT CURE.

According to an exemplary embodiment, the cured UV-curable adhesive 120 of the splice protector 118 has a low-profile, such as having a thickness in the thickness axis T that is less than 2 mm (e.g., less than 1 mm, less than 0.75 mm, less than 0.5 mm) thicker than either the first or second fiber optic ribbons 112, 114 in the thickness axis T. Furthermore, in some embodiments the cured UV-curable adhesive 120 has a narrow-profile, having a width in the width axis W that is less that 2 mm (e.g., less than 1 mm, less than 0.75 mm, less than 0.5 mm) wider than either the first or second fiber optic ribbons 112, 114 in the width axis W.

According to one example, a twelve-fiber fiber optic ribbon 112, 114 has a width of about 3.1 mm and thickness of about 0.3 mm. A corresponding twelve-fiber UV-curable adhesive splice mold 122 (e.g., Teflon) has a length of 30 mm, a width of 3.9 mm, and a thickness of 1.25 mm, without including a substrate in addition to the mold 122. In such an example, the splice mold 122 defines the exterior of the splice protector 118. In another example, a functional UV-curable adhesive splice protector 118 for the twelve-fiber ribbons 112, 114 has a length of 27 mm, a width as small as 3.3 mm, and a thickness as thin as 0.6 mm, not including a substrate in addition to the mold 122.

A narrow and low-profile UV-curable adhesive splice protector 118 allows the splice 116 to be inserted into a correspondingly narrow structure, such as a furcation tube, back into the jacket of a distribution cable, an overmold, or another narrow supporting structure. The narrow structure surrounding the splice 116 then allows for translation of the associated fiber optic assembly within correspondingly narrow ducts or other confined spaces, which may improve installation of the associated fiber optic assembly in a data center or elsewhere.

In some embodiments, the splice protector 118 of the fiber optic assembly includes a substrate 124 to provide extra strength to the splice 116. The substrate 124 may be integrated or integral with the mold 122, or may be a separate body in addition to the mold 122. Put another way, the mold 122 may serve as the substrate in addition to being the mold 122. In some embodiments, the splice protector 118 includes a translucent, flexible substrate 124.

In other embodiments, the substrate 124 is a thin polymeric material, such as Teflon, placed interior to the mold 122, between the mold 122 and the optical fiber. In some embodiments, the splice protector is a thin, flexible glass sheet (e.g., sheet of WILLOW™ glass manufactured by CORNING INCORPORATED). In some such embodiments, the thin, flexible glass sheet is less than 0.25 mm thick, such as about 0.15 mm thick, and therefore does not greatly increase the profile of the splice protector 118. The sheet may or may not be flat.

In other embodiments, the splice protector 118 does not include a substrate 124. The cured UV-curable adhesive 120 provides sufficient tensile strength for the splice 116. As such, in some embodiments, the splice protector 118 is formed entirely from (e.g., consists of) UV-curable adhesive. Omission of the substrate 124 significantly reduces the materials required for protecting the splice 116, saving costs associated with the substrate 124 as well as manufacturing time to prepare the substrate 124. Furthermore, using only UV-curable adhesive 120 for the splice protector 118 provides increased reliability for the performance of the splice protector 118 by removing variability associated with interactions between different materials in the splice protector 118 and the specific fracture mechanics of the materials and corresponding interface.

In contemplated embodiments, the splice protector 118 includes a matrix or binding agent other than a UV-curable adhesive, such as an epoxy or other type of adhesive, thermoplastic, tape, or other material that may still provide the flexibility and profile characteristics disclosed herein. However, such materials may not be as quick to cure, as uniform, as efficient to apply, or as flexible as UV-curable adhesive. In at least some contemplated embodiments, a flexible substrate 124, such as a flexible glass substrate, is used to support a splice 116 and is bound to the splice 116 with a heat shrink, such that UV-curable adhesive is not included.

Applicants note that methods and structures disclosed herein may not perform in the same way for single-fibers as with fiber optic ribbons. The ribbon profile allows for a greater volume of adhesive to be used without greatly increasing the profile of the splice protector about the splice, as disclosed herein. Single fibers may require a greater ratio of adhesive to achieve sufficient support for protection of the splice, which may decrease the flexibility of the spliced area and/or increase the profile of the splice protector. However, in contemplated embodiments, a UV-curable adhesive or other adhesive, with molds and substrates as disclosed herein, may be used to support the splice of single-fibers.

Referring now to FIGS. 2-7, a method of manufacturing a fiber optic assembly 210 includes a step of splicing first and second fiber optic ribbons 212, 214, as shown in FIG. 2. As discussed above with regard to the embodiment of FIG. 1, the first and second fiber optic ribbons 212, 214 each include a plurality of optical fibers 216 coupled in a substantially flat arrangement where the optical fibers 216 are aligned side-by-side with one another. The step of splicing includes fusion splicing the optical fibers 216 of the first ribbon 212 with the optical fibers 216 of the second ribbon 214 such that the spliced ribbons 212, 214 at the splice 218 (e.g., multi-fiber fusion splice) have common lengthwise, widthwise, and thickness axes (see FIG. 1). During manufacturing, the ribbon fibers 212, 214 may be placed into a fixture that holds the fibers straight, as shown in FIG. 2.

Figure 3:
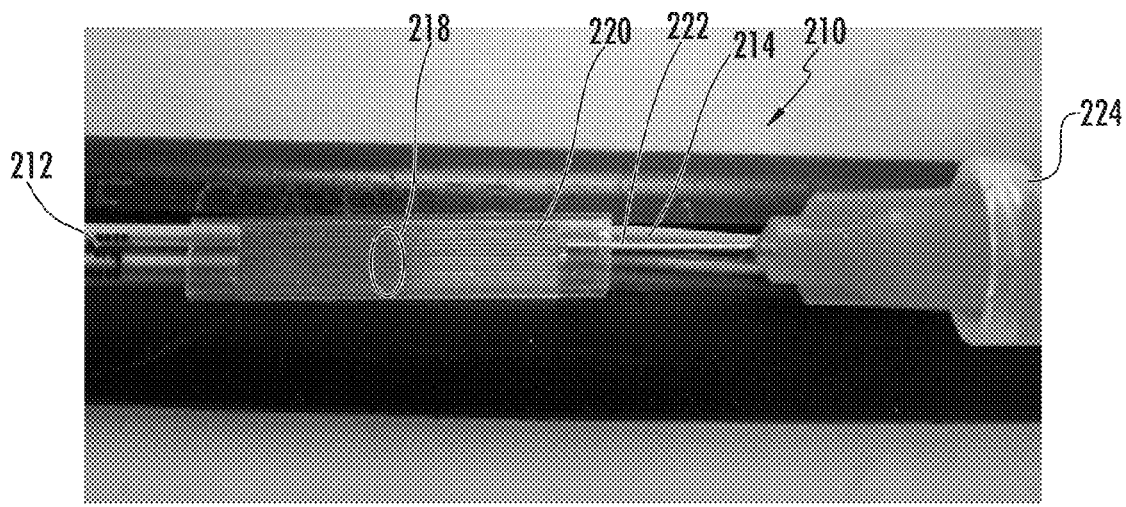
FIG. 3 is a digital image of liquid UV-curable adhesive being inserted over the spice of FIG. 2, surrounded by a translucent mold according to an exemplary embodiment.

Referring now to FIG. 3, the method of manufacturing a fiber optic assembly 210 includes a step of coupling (e.g., contacting) a substrate 220 (e.g., Teflon mold) with the first and second fiber optic ribbons 212, 214, where the substrate 220 is translucent and able to communicate ultra-violet light. In some embodiments, the substrate 220 includes a flattened sleeve that slides over one the first and second ribbons 212, 214 prior to the splicing step, and then slides over the splice 218 following the splicing step. In other contemplated embodiments, an substrate, such as a sheet is used with or in place of the substrate 220.

According to an exemplary embodiment, the method further includes applying a liquid, UV-curable adhesive around the splice 218 and supported by the substrate 220. In some embodiments, the method includes inserting a needle 222 coupled to a syringe 224 or other pump that supplies the liquid UV-curable adhesive to the splice 218. The liquid UV-curable adhesive then fills space around the splice 218. For example, a Teflon mold cavity is centered over the splice 218 and injected with UV adhesive material. In some embodiments, a heat shrinkable tube surrounds the splice 218.

Figure 4:
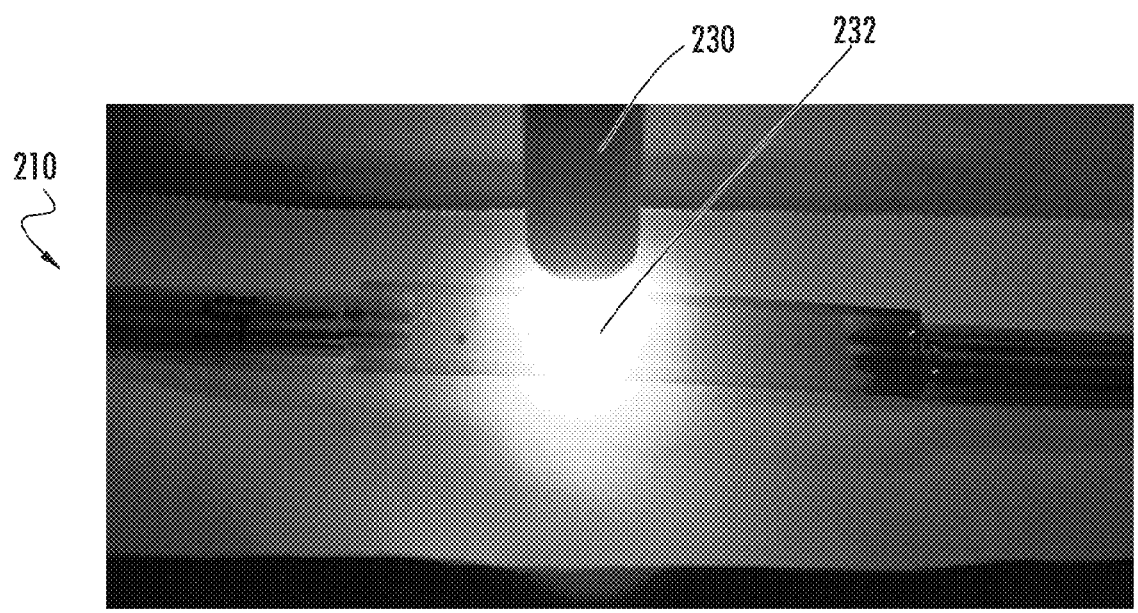
FIG. 4 is a digital image of UV-curing of the adhesive of FIG. 3 according to an exemplary embodiment.

Referring to FIG. 4, the method of manufacturing a fiber optic assembly 210 includes directing light from an ultraviolet light source 230 at the UV-curable adhesive 232 through the substrate 220 to cure the UV-curable adhesive 232. The ultra-violet light may reach the UV-curable adhesive prior to and/or following transmission through the substrate 220. A mirror or other reflector may be positioned below the splice 218 to reflect the ultra-violet light back toward the underside of the splice 218. The splice 218 may also be flipped during curing. For example, the UV material may be cured for approximately 30 sec on each side of the splice.

Figure 5:
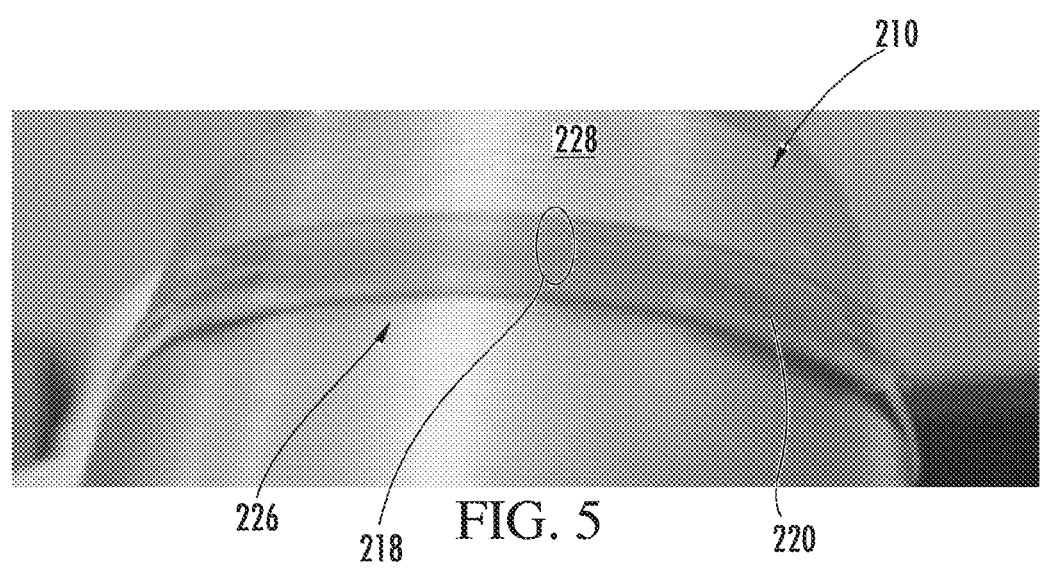
FIG. 5 is a digital image of the splice protector of FIG. 4, following the curing, flexing about a mandrel according to an exemplary embodiment.

According to an exemplary embodiment, the UV-curable adhesive 232 encapsulates the splice 218 and, at least in part, forms a splice protector 226. As shown in FIG. 5, the splice protector formed with the mold 220 and UV-curable adhesive 232 is flexible and may readily bend over a 1.25-inch mandrel 228 without damaging the splice 218 or splice protector 226.

Figure 6:
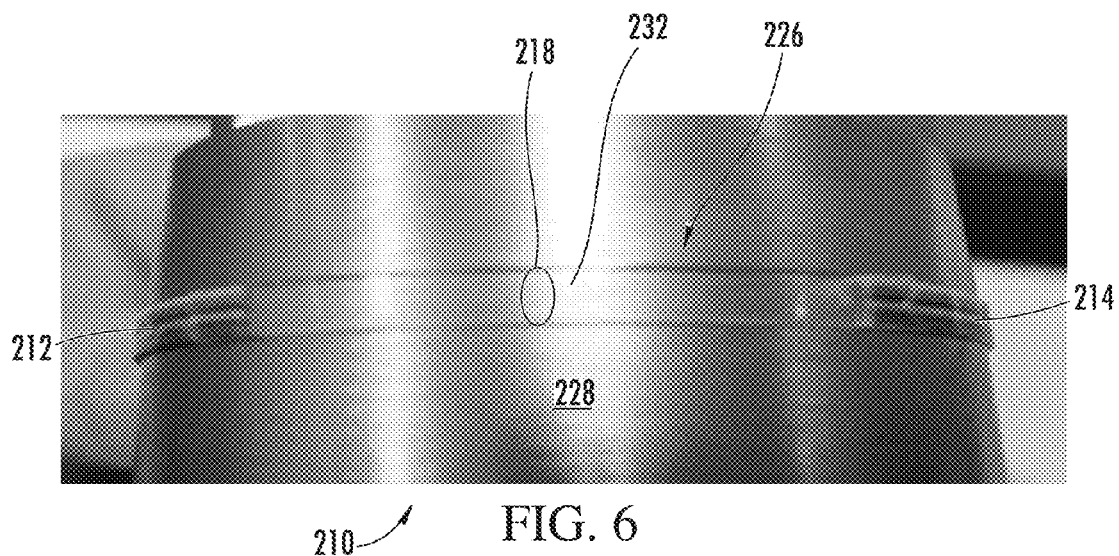
FIG. 6 is a digital image of the splice protector of FIG. 4 flexing about the mandrel of FIG. 5 with the mold removed according to an exemplary embodiment.
Figure 7:
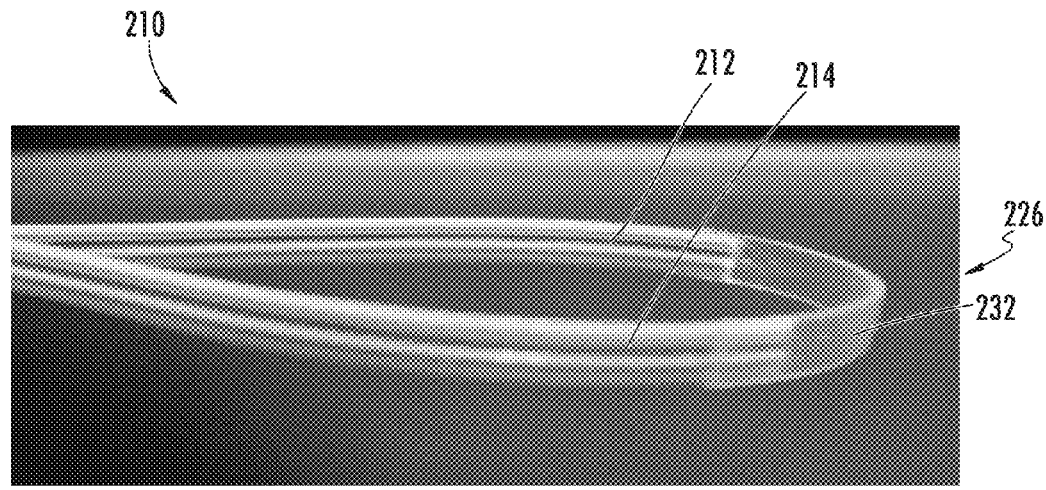
FIG. 7 is another digital image of the splice protector of FIG. 6 flexing according to an exemplary embodiment.

According to an exemplary embodiment, the method may further include a step of peeling the substrate 220 off of the cured UV-curable adhesive 232, such that the splice protector 226 then does not include the substrate 220. Instead, the splice protector 226, as shown in FIGS. 6-7, consists of UV-curable adhesive 232 encapsulating the spliced optical fibers 216. Removing the substrate may improve the flexibility of the splice protector 226. Referring to FIGS. 6-7, the splice protector 226 without the substrate or mold after UV adhesive curing, readily bends over the 1.25-inch mandrel 228. Furthermore, the bend radius is not limited to 1.25 inches, as shown in FIG. 7.

According to an exemplary embodiment, the flexible splice protectors disclosed herein may be used with different fiber optic assemblies, including FlexNAP™ manufactured by CORNING CABLE SYSTEMS LLC, or more-generally in assemblies that operate in tight areas where bending is expected or uncontrolled. The low-profile and flexible design of the splice protectors allow an operator to insert a protected splice back inside a distribution cable, as if it were part of the internal structure of the cable. For example, embodiments disclosed herein allow for placement of the protected splice within the cavity of an RPX® distribution cable manufactured by CORNING CABLE SYSTEMS LLC.

According to an exemplary embodiment, the protected splice is also able to flex within the RPX distribution cable when operators install the cable around sheave wheels and the like. For example, sheave wheel testing at 600-lbs load with temperatures of −30° C. and 40° C., as per GR-3122 testing standards, have shown the protected splice to survive at these extremes. As such, embodiments disclosed herein enable a low-profile FlexNAP design using an RPX distribution cable, allowing FlexNAP to fit in smaller ducts, and thereby reducing costs to the customer. By way of example, dimensions and structural details of fiber optic cables and tether assemblies similar to FlexNAP and RPX ribbon cable are disclosed in International Application PCT/US06/29716 filed Jul. 27, 2006, which is incorporated by reference herein in its entirety.

The construction and arrangements of the splice protector, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, UV adhesive could be substituted with other materials that are flexible, as well as the Teflon substrate/mold. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A fiber optic assembly, comprising:
    first and second fiber optic ribbons, each comprising a plurality of optical fibers coupled in a substantially flat arrangement where the optical fibers are aligned side-by-side with one another, wherein the optical fibers of the first ribbon are fusion spliced with the optical fibers of the second ribbon such that the spliced ribbons at the splice have a common lengthwise axis, widthwise axis orthogonal to the lengthwise axis, and thickness axis orthogonal to the lengthwise and widthwise axes; and
    a splice protector supporting the optical fibers of the first and second fiber optic ribbons that are spliced to one another at the splice, wherein the splice protector comprises an ultra-violet light (UV-) curable adhesive that provides a flexible support for the splice, wherein the splice protector is at least half as flexible when cured over the splice as the first and second ribbons in bending about the widthwise axis.

2. The fiber optic assembly of claim 1, wherein the UV-curable adhesive has a low-profile, having a thickness in the thickness axis that is less than 1 mm thicker than either the first or second fiber optic ribbons in the thickness axis.

3. The fiber optic assembly of claim 2, wherein the UV-curable adhesive has a narrow-profile, having a width in the width axis that is less that 1 mm wider than either the first or second fiber optic ribbons in the width axis.

4. The fiber optic assembly of claim 1, wherein the splice protector is at least as flexible when cured over the splice as the first and second ribbons in bending about the widthwise axis.

5. The fiber optic assembly of claim 4, wherein the splice protector does not include a substrate.

6. The fiber optic assembly of claim 5, wherein the splice protector consists of UV-curable adhesive.

7. The fiber optic assembly of claim 1, wherein the splice protector comprises a translucent, flexible substrate.

8. The fiber optic assembly of claim 7, wherein the translucent, flexible substrate is a thin, flexible glass sheet.

9. The fiber optic assembly of claim 8, wherein the thin, flexible glass sheet is less than 0.25 mm thick.

10. A fiber optic assembly, comprising:
    first and second fiber optic ribbons, each comprising a plurality of optical fibers coupled in a substantially flat arrangement where the optical fibers are aligned side-by-side with one another, wherein the optical fibers of the first ribbon are fusion spliced with the optical fibers of the second ribbon such that the spliced ribbons at the splice have a common lengthwise axis, widthwise axis orthogonal to the lengthwise axis, and thickness axis orthogonal to the lengthwise and widthwise axes; and
    a splice protector supporting the optical fibers of the first and second fiber optic ribbons that are spliced to one another at the splice, wherein the splice protector comprises an ultra-violet light (UV-) curable adhesive facilitating a controlled profile for the splice protector;
    wherein the UV-curable adhesive has a low-profile, having a thickness in the thickness axis that is less than 1 mm thicker than either the first or second fiber optic ribbons in the thickness axis;
    wherein the UV-curable adhesive has a narrow-profile, having a width in the width axis that is less that 1 mm wider than either the first or second fiber optic ribbons in the width axis; and
    wherein the splice protector provides a flexible support for the splice, wherein the splice protector is at least half as flexible when cured over the splice as the first and second ribbons in bending about the widthwise axis.

11. The fiber optic assembly of claim 10, wherein the splice protector does not include a substrate.

12. The fiber optic assembly of claim 11, wherein the splice protector consists of UV-curable adhesive.

13. A method of manufacturing a fiber optic assembly, comprising steps of:
    splicing first and second fiber optic ribbons, each comprising a plurality of optical fibers coupled in a substantially flat arrangement where the optical fibers are aligned side-by-side with one another, wherein splicing includes fusion splicing the optical fibers of the first ribbon with the optical fibers of the second ribbon such that the spliced ribbons at the splice have a common lengthwise axis, widthwise axis orthogonal to the lengthwise axis, and thickness axis orthogonal to the lengthwise and widthwise axes;
    coupling a substrate with the first and second fiber optic ribbons, wherein the substrate is translucent and able to communicate ultra-violet light;
    applying a liquid, ultra-violet light (UV-) curable adhesive around the splice and supported by the substrate;
    directing ultra-violet light through the substrate and at the UV-curable adhesive to cure the UV-curable adhesive, encapsulating the splice and forming a splice protector; and
    peeling the substrate off of the cured UV-cured adhesive, such that the splice protector does not include a substrate.

14. The method of claim 13, wherein the splice protector consists of UV-curable adhesive.

15. The method of claim 13, wherein the splice protector is at least half as flexible when cured over the splice as the first and second ribbons in bending about the widthwise axis.

16. The method of claim 15, wherein the cured UV-curable adhesive has a low-profile, having a thickness in the thickness axis that is less than 1 mm thicker than either the first or second fiber optic ribbons in the thickness axis.

17. The method of claim 16, wherein the cured UV-curable adhesive has a narrow-profile, having a width in the width axis that is less that 1 mm wider than either the first or second fiber optic ribbons in the width axis.

18. The method of claim 13, curing the UV-curable adhesive with a UV-light source in about one minute or less.

* * * * *